(12) United States Patent
Bourbotte et al.

(10) Patent No.: US 8,610,063 B2
(45) Date of Patent: Dec. 17, 2013

(54) SYSTEM FOR TRANSMITTING AN ELECTRICAL SIGNAL, IN PARTICULAR FREQUENCY-RELATED, AND RADIATION MEASUREMENT DEVICE EQUIPPED WITH SUCH A SYSTEM

(75) Inventors: Jean-michel Bourbotte, Chatilly en Bierre (FR); Loïc Barbot, Paris (FR); Stéphane Normand, Mantes la Jolie (FR); Vladimir Kondrasovs, Palaiseau (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 264 days.

(21) Appl. No.: 12/997,114

(22) PCT Filed: Jun. 9, 2009

(86) PCT No.: PCT/EP2009/057120
§ 371 (c)(1), (2), (4) Date: Mar. 9, 2011

(87) PCT Pub. No.: WO2009/150157
PCT Pub. Date: Dec. 17, 2009

(65) Prior Publication Data
US 2011/0147590 A1 Jun. 23, 2011

(30) Foreign Application Priority Data
Jun. 10, 2008 (FR) ...................................... 08 03220

(51) Int. Cl.
*G01T 5/06* (2006.01)

(52) U.S. Cl.
USPC .......... 250/336.1; 333/12; 333/123; 333/124; 174/68.1

(58) Field of Classification Search
USPC .......... 250/336.1; 333/12, 123, 124; 174/68.1
See application file for complete search history.

(56) References Cited

U.S. PATENT DOCUMENTS

| | | | | | |
|---|---|---|---|---|---|
| 2,824,238 | A | * | 2/1958 | Stellmacher | 250/388 |
| 3,274,520 | A | * | 9/1966 | Eddy et al. | 333/127 |
| 3,705,365 | A | * | 12/1972 | Szabo et al. | 333/12 |
| 3,778,759 | A | * | 12/1973 | Carroll | 367/43 |
| 3,895,370 | A | * | 7/1975 | Valentini | 307/104 |
| 3,973,181 | A | * | 8/1976 | Calvert | 324/355 |
| 4,634,568 | A | * | 1/1987 | Wimpee et al. | 376/154 |
| 4,800,344 | A | * | 1/1989 | Graham | 333/25 |
| 4,899,162 | A | * | 2/1990 | Bayetto et al. | 343/700 MS |
| 5,089,886 | A | * | 2/1992 | Grandmougin | 725/143 |
| 5,113,159 | A | * | 5/1992 | Adriaenssens et al. | 333/12 |
| 5,247,270 | A | * | 9/1993 | Harman et al. | 333/237 |
| 5,296,823 | A | * | 3/1994 | Dietrich | 333/26 |
| 5,321,372 | A | * | 6/1994 | Smith | 333/1 |
| 5,949,327 | A | * | 9/1999 | Brown | 375/258 |
| 6,097,262 | A | * | 8/2000 | Combellack | 333/12 |

(Continued)

*Primary Examiner* — David Porta
*Assistant Examiner* — Taeho Jo
(74) *Attorney, Agent, or Firm* — Baker & Hostetler LLP

(57) ABSTRACT

A system for transmitting an electrical signal, notably a frequency-related electrical signal, includes two conducting lines each having a central conductor surrounded by a conducting sheath, the lines being coupled and isolated from one another at each end by a transformer. The central conductor of a line is linked at the input of the system to a coil of a first transformer and at the output of the system to a coil of the second transformer. The invention is applied for example for the transmission of strongly disturbed environment measurement signals.

10 Claims, 3 Drawing Sheets

(56) References Cited

U.S. PATENT DOCUMENTS

| | | | |
|---|---|---|---|
| 6,469,636 B1 * | 10/2002 | Baird et al. | 340/854.9 |
| 6,489,782 B1 * | 12/2002 | Baier et al. | 324/551 |
| 6,809,609 B1 * | 10/2004 | Shibata et al. | 333/12 |
| 6,897,764 B2 * | 5/2005 | Cern | 375/258 |
| 7,405,574 B2 * | 7/2008 | Wasaki et al. | 324/613 |
| 2002/0079903 A1 * | 6/2002 | Smith et al. | 324/536 |
| 2002/0079906 A1 * | 6/2002 | Rashkes et al. | 324/544 |
| 2003/0085816 A1 * | 5/2003 | Baird et al. | 340/854.9 |
| 2010/0094123 A1 * | 4/2010 | Lips et al. | 600/421 |

* cited by examiner

SYSTEM FOR TRANSMITTING AN ELECTRICAL SIGNAL, IN PARTICULAR FREQUENCY-RELATED, AND RADIATION MEASUREMENT DEVICE EQUIPPED WITH SUCH A SYSTEM

CROSS-REFERENCE TO RELATED APPLICATIONS

This application is a National Stage of International patent application PCT/EP2009/057120, filed on Jun. 9, 2009, which claims priority to foreign French patent application No. FR 08 03220, filed on Jun. 10, 2008, the disclosures of which are incorporated by reference in their entirety.

FIELD OF THE INVENTION

The present invention relates to a system for transmitting an electrical signal, notably frequency-related. It also relates to a radiation measurement device equipped with such a system. The invention is applied for example for the transmission of strongly electromagnetically disturbed environment measurement signals.

BACKGROUND OF THE INVENTION

The transport of electrical signals assumes a paramount character in the optimal operation of measurement systems. Indeed, poor quality of transmission can complicate, or indeed prevent, utilization of the measurements. This problem becomes all the more acute when the transmission takes place in a strongly disturbed electromagnetic environment and over large distances.

It is known that monofilar transmission poses signal propagation problems. In particular in the case of the transmission of differential signals, parasitic perturbing signals are superimposed on the useful signals, and in this case more or less complex physical shieldings are used to limit the effects thereof.

Bifilar transmission is used but in general only for measurements of current. There is no transmission of frequency signals by bifilar link, because notably of the difficulty in implementing the measurement system situated downstream. The parasitic perturbations which may appear in the current signal then remain limited to leakage currents. The presence of a guard annulus generally makes it possible to limit the impact thereof.

SUMMARY OF THE INVENTION

An aim of the invention is notably to allow the transmission of signals in strongly disturbed media, this transmission being insensitive to exterior parasitic electromagnetic perturbations. For this purpose, the subject of the invention is a system for transmitting an electrical signal, comprising two conducting lines each composed of a central conductor surrounded by a conducting sheath, said lines being coupled and isolated from one another at each end by a transformer, the central conductor of a first line being linked at the input of said system to the input of a coil of a first transformer, said coil being able to receive at its input the electrical signal to be transmitted, and being linked at the output of said system to a coil of the second transformer, said coil delivering the electrical signal; the central conductor of the other line being linked to a second coil of the first transformer and being linked to a second coil of the second transformer.

The subject of the invention is also a radiation measurement device comprising at least:
a radiation sensor delivering an electrical signal representative of a radiation;
a transmission system as claimed in any one of the preceding claims, connected to the sensor and intended to transmit said electrical signal.

Advantageously, the invention makes it possible to exploit the propagation of the signals on bifilar transmission systems while being transparent in relation to the measurement systems situated downstream of the transmission and which may be exactly the same as if this were a monofilar transmission.

BRIEF DESCRIPTION OF THE DRAWINGS

Other characteristics and advantages of the invention will become apparent with the aid of the description which follows offered in relation to appended drawings which represent.

DETAILED DESCRIPTION

Figure 1:
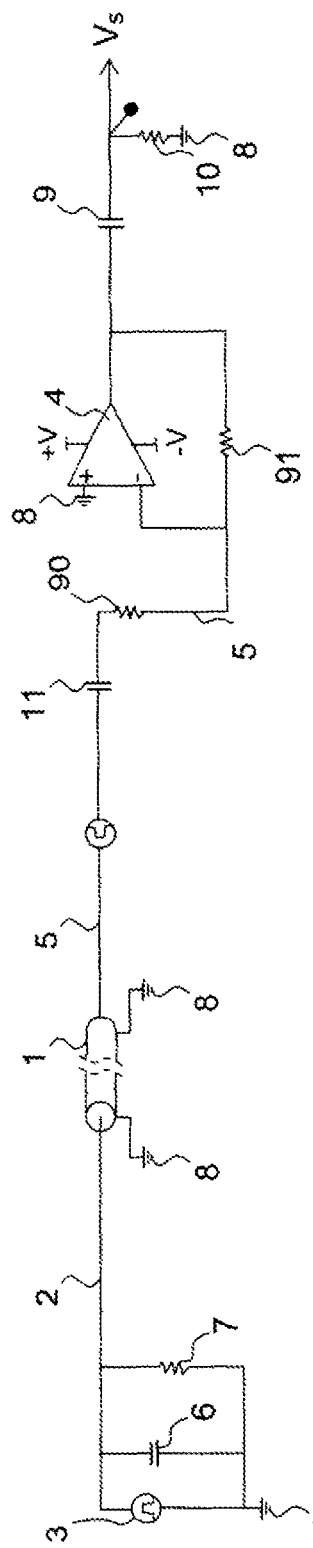
FIG. 1, an electrical diagram of an exemplary transmission system according to the prior art.

FIG. 1 illustrates an exemplary embodiment of a conventional transmission system, of monofilar type. The system comprises a line of coaxial type 1. This coaxial line adapted for conveying a frequency signal comprises a central conductor surrounded by a conducting sheath linked to a reference potential 8, the central conductor and the sheath being separated by a dielectric material.

The central conductor is prolonged, or linked, on one side to a frequency- or pulse-type signal generator 3, via a conducting line element 2. On the other side, the central conductor is linked to an amplifier 4 connected in follower mode via a conducting line element 5. The signal generator 3 is for example a detector, a sensor or any other measurement instrument delivering a signal representative of a physical quantity. It will be considered subsequently by way of example that this is a sensor, notably a radiation sensor. In this respect this component 3 can comprise for example an optoelectronic coupler.

The signal provided is, for example, shaped by a filter composed of a capacitor 6 and of a resistor 7 in parallel. One end of the filter is linked to a terminal of the generator 3 and the other end is linked to the reference potential 8, subsequently called the ground potential, and forming the zero electrical. On the output side, the signal arising from the coaxial line is amplified by an amplifier 4 mounted in follower mode. A decoupling capacitor 11 is for example placed upstream of the amplifier on the line 5. Downstream of this capacitor, the line is connected to a first resistor 90 linked at its other end to the negative input of the amplifier. A second resistor 91 is linked between this negative input and the output of the amplifier. The signal is then amplified in a conventional manner in the ratio of the resistances.

The positive input of the amplifier 4 is linked to the ground potential 8. The amplifier is supplied between a potential +V and a potential −V. The output of the amplifier 4 provides the output signal Vs, optionally after passage through a filter composed of a capacitor 9 and of a resistor 10.

Figure 2:
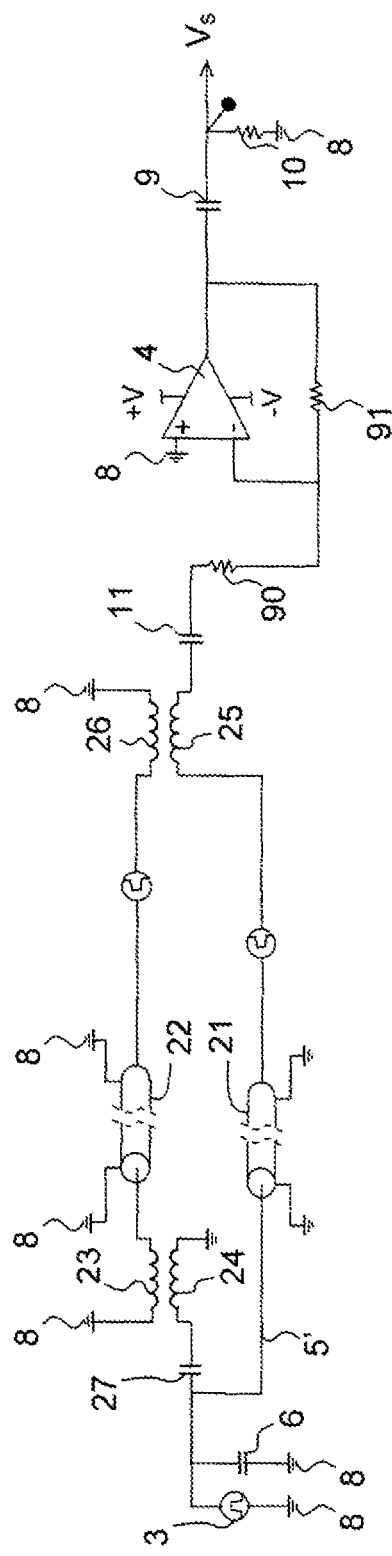
FIG. 2, the electrical diagram of an exemplary embodiment of a transmission system according to the invention.

FIG. 2 illustrates a transmission system according to the invention. The transmission system of FIG. 2 is of bifilar type in the sense that it comprises two coupled lines of coaxial type 21, 22 of the type of that described for the system of FIG. 1. These lines 21, 22 are isolated at each end by a transformer.

Thus, the system comprises a system of isolation coils 23, 24, 25, 26 on either side of the two lines. The galvanic isolation thus produced between the two coaxial lines makes it possible to profit from the differential effect of the propagation of the signal, while retaining the standard electronic device used for the processing arising from the sensor 3, defined for a connection of monofilar type. Indeed, the system downstream of the output coils 25, 26 is identical to what is traditionally installed for the processing of the signal. The system according to the invention does not therefore require any redefinition or modification of the electronic processing circuits while allowing a significant gain in the signal-to-noise ratio.

The system of FIG. 2 therefore comprises a first coaxial line 21 linked at the output of the sensor 3. The second coaxial line 22 is linked to the output of the sensor 3 via a first system of coils 23, 24. More particularly, the coaxial line 22 is linked to a first coil 23, itself coupled to a second coil 24 linked to the sensor 3 via a decoupling capacitor 27 for example. The other end of this coil 24 is linked to the ground potential 8. The end of the first coil 23, opposite from that linked to the coaxial line 22 is linked to the ground potential 8.

The output of the first coaxial line 21 is linked at output to a third coil 25, itself coupled to a fourth coil 26 linked to the output of the second coaxial line 22. The end of the fourth coil 26 not linked to the coaxial line is linked to the reference potential 8. The end of the third coil 25 not linked to the coaxial line 21 forms the output of the bifilar link thus produced. It is for example linked to an electronic output circuit 11, 4, 90, 91, amplifier, of the type of that of FIG. 1.

The two systems of coils 23, 24, 25, 26 at input and at output of the bifilar link form a galvanic isolation between the two lines 21, 22. The propagation of the signal takes place in a differential manner between the two lines, thereby making it possible to significantly limit the effect of the parasitic perturbing environments on the quality of the information. The first two coils 23, 24 coupled together form a first transformer component. The other two coils 25, 26 likewise coupled together form a second transformer component. In practice, these transformers have primary to secondary voltage ratios equal to 1. It is however possible to envisage other voltage ratios.

The invention advantageously uses these two transformers 23, 24, 25, 26. This type of passive component is particularly resistant to the effect of dose. Thus, the components used to carry out the differential function are passive components exhibiting good resilience to radiations. A system according to the invention therefore gains in terms of immunity to parasitic perturbations while maintaining its high resistance in relation to the effects of environmental ionizing radiation for example.

Figure 3:
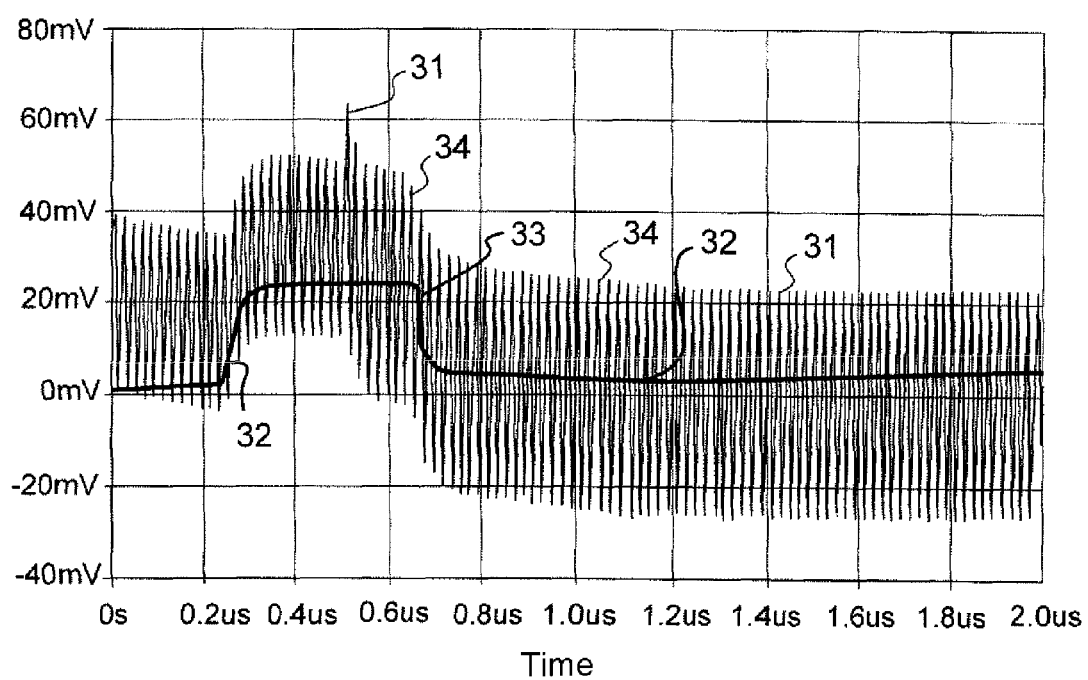
FIG. 3, an illustration of the performance of a system according to the invention through the representation of transmitted signals.

FIG. 3 illustrates the significant improvement afforded by a transmission system according to the invention. A first curve 31 represents the propagation of a signal at a given point of the line, as a function of time, for a monofilar system of the type of that of FIG. 1. For this purpose, the abscissa axis represents time, the values varying by way of example between 0 and 2 μs, and the ordinate axis represents the amplitude of the signal, varying for example between −40 mV and +80 mV.

A second curve 32 represents the propagation of the signal in the bifilar system according to the invention as illustrated by FIG. 2.

In the two cases, the signal generated by the sensor 3 is the same; it is a pulse. It is very markedly apparent that for one and the same source of electromagnetic radiation noise, disturbing a monofilar link, the bifilar system makes it possible to considerably reduce the impact of this radiation on the transmitted pulse 33. Curve 31 representative of the signal transmitted by the line of FIG. 1 indeed shows that the pulse transmitted is very markedly perturbed by the noise 34 whereas curve 32 represents the transmission of a pulse where this noise no longer appears.

Figure 4:
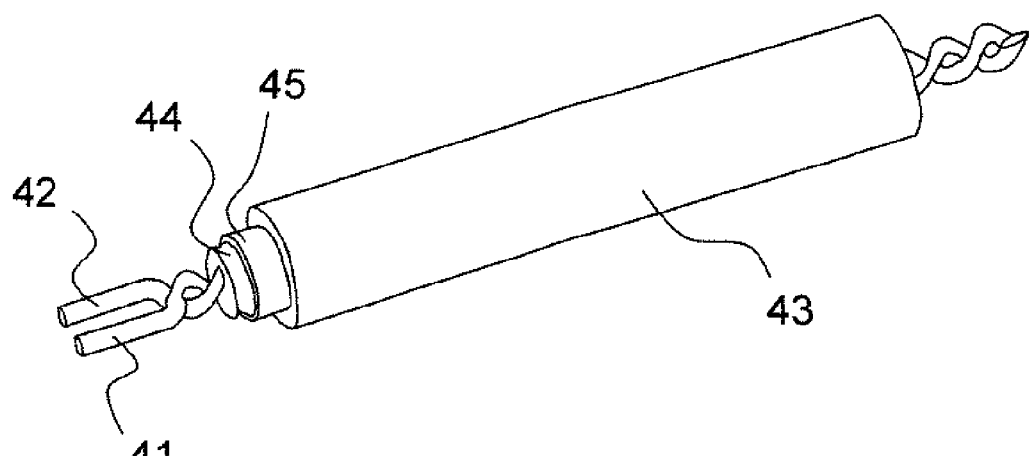
FIG. 4, a possible embodiment of a transmission system usable according to the invention.

FIG. 4 illustrates a possible exemplary embodiment of a bifilar line used in a system according to the invention. In this case, the two central conductors 41, 42 are placed inside one and the same sheath. The conductors are embedded in a cylindrical dielectric 44 surrounded by a conducting sheath 45, itself covered for example with an insulating protective sheath 43. In the case of FIG. 4, the two conductors are twisted, thereby still further limiting the effect of the parasitic perturbing radiations and therefore of the noise.

Figure 5:
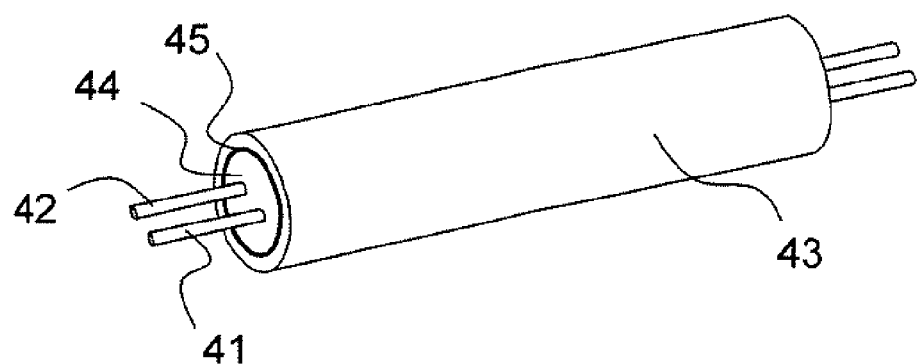
FIG. 5, another possible embodiment of a transmission system usable according to the invention.

FIG. 5 illustrates another possible embodiment where the central conductors 41, 42 are not twisted but juxtaposed. In this case, each conductor 41, 42 is not situated at the center of the sheath; it is their perpendicular bisector which is situated at the center.

Other embodiments are possible. In particular, it is possible not to place the two conductors 41, 42 in one and the same sheath and thus to envisage two physically separate lines where each conductor 41, 42 is in a distinct sheath. In this case two physically distinct complementary monofilar cables are used in parallel. Among the advantages of this system, the characteristic impedance of the line may be adapted to each type of use, thereby facilitating the transmission of a frequency signal. Thus, for an application to certain electronic circuits existing in the nuclear sector, the characteristic impedance may advantageously be equal to 25 or 50 ohms.

A transport line according to the invention is differential. Nonetheless, on account of its design, a system according to the invention does not require any differential amplifier for processing the information. As shown by the electrical layout diagram of FIG. 2, it is not necessary to modify the existing electronic circuits for amplification 90, 91, 4 and for processing. Merely a modification of the cable with the two transformers 23, 24, 25, 26 is required in order to profit from the advantage of the differential link.

It may also be possible to convey a high bias voltage by simply adding two symmetric injection resistors on the two wires of the differential line.

The invention can advantageously be applied to the transport of signals arising from radiation detectors, for example radiations from fission chambers in nuclear installations.

The invention can also be applied to applications involving the transport of broadband frequency signals, of low amplitude, over large distances and in a strongly disturbing electromagnetic environment.

The invention claimed is:

1. A system for transmitting an electrical signal, comprising: two conducting lines each comprising a central conductor surrounded by a conducting sheath, said conducting lines being coupled and isolated from one another at each end by a pair of transformers, a first transformer thereof being formed of a first coil and a second coil, a second transformer thereof being formed of a third coil and a fourth coil, wherein the central conductor of a first line is linked at the input of said system to the input of the second coil of the first transformer, said second coil being able to receive at its input the electrical signal to be transmitted, and linked at the output of said system to the third coil of the second transformer, said third coil delivering the electrical signal, the central conductor of the second line is linked to the first coil of the first transformer and is linked to the fourth coil of the second transformer, and the inputs of the coils which are not linked to the lines being connected to a reference potential so that the lines are isolated from one another.

2. The transmission system as claimed in claim 1, wherein the sheath of a conducting line is linked to a reference potential.

3. The transmission system as claimed in claim 1, wherein a decoupling capacitor is connected between the input of the first line and the second coil of the first transformer.

4. The transmission system as claimed in claim 3, wherein the central conductors are twisted together.

5. The transmission system as claimed in claim 1, wherein the central conductors are placed in a dielectric material inside one and the same conducting sheath.

6. The system as claimed in claim 1, wherein the signal is of frequency-related type.

7. The device as claimed in claim 6, wherein the radiation is emitted in a nuclear fission chamber.

8. A radiation measurement device, comprising:
a radiation sensor delivering an electrical signal representative of a radiation; and
a transmission system as claimed in claim 1, connected to the sensor to transmit said electrical signal.

9. The device as claimed in claim 8, wherein an amplification device is connected at the output of the transmission system.

10. A transmission system, comprising:
a sensor configured to generate a signal; and
a bifilar type connection including a first coaxial line and a second coaxial line each coupled to a first transformer and a second transformer, the first transformer including a first coil and a second coil and the second transformer including a third coil and a fourth coil,
a first end of a central conductor of the first coaxial line coupled directly to an output of the sensor and a second end of the central conductor of the first coaxial line coupled directly to a first end of the third coil,
a first end of a central conductor of the second coaxial line coupled to the second coil of the first transformer and a second end of the central conductor of the second coaxial line coupled directly to a first end of the fourth coil,
wherein the signal generated by the sensor is provided to an amplifier coupled to the second transformer.

* * * * *

UNITED STATES PATENT AND TRADEMARK OFFICE
CERTIFICATE OF CORRECTION

PATENT NO.        : 8,610,063 B2                                    Page 1 of 1
APPLICATION NO.   : 12/997114
DATED             : December 17, 2013
INVENTOR(S)       : Bourbotte et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 353 days.

Signed and Sealed this

Twenty-second Day of September, 2015

Michelle K. Lee
*Director of the United States Patent and Trademark Office*